United States Patent
Eckhart

[11] 3,859,985
[45] Jan. 14, 1975

[54] ANGIOGRAPHY VALVE
[75] Inventor: Edgar O. Eckhart, Livingston, N.J.
[73] Assignee: Becton, Dickinson and Company, East Rutherford, N.J.
[22] Filed: June 27, 1973
[21] Appl. No.: 373,978

[52] U.S. Cl. ........ 128/2.05 R, 128/214 B, 128/274, 137/625.17, 251/344
[51] Int. Cl. .......................................... A61m 01/03
[58] Field of Search ........... 128/2 A, 2.05 R, 214 R, 128/214 B, 214.2, 274; 137/625.17, 625.4, 616; 251/344

[56] References Cited
UNITED STATES PATENTS

| | | | |
|---|---|---|---|
| 2,062,285 | 12/1936 | Bergman | 128/274 X |
| 2,509,671 | 5/1950 | Christensen | 251/344 |
| 2,842,124 | 7/1958 | James | 128/214 B |
| 3,344,785 | 10/1967 | Hamilton | 128/214 B |

*Primary Examiner*—Dalton L. Truluck
*Attorney, Agent, or Firm*—Kane, Dalsimer, Kane, Sullivan and Kurucz

[57] ABSTRACT

A valve which is particularly adapted to be inserted in a predetermined flow line arrangement in angiography procedures. The valve includes an inner member having at least one axial bore and at least one annular groove communicating with each bore. At least one sealing ring is exteriorly mounted on the inner member to isolate the grooves. An outer member having a radially extending outlet is mounted on the inner member so as to be rotatably and reciprocally movable with respect thereto so as to selectively place the outlet in communication with one of the grooves and point it in any desired direction.

6 Claims, 11 Drawing Figures

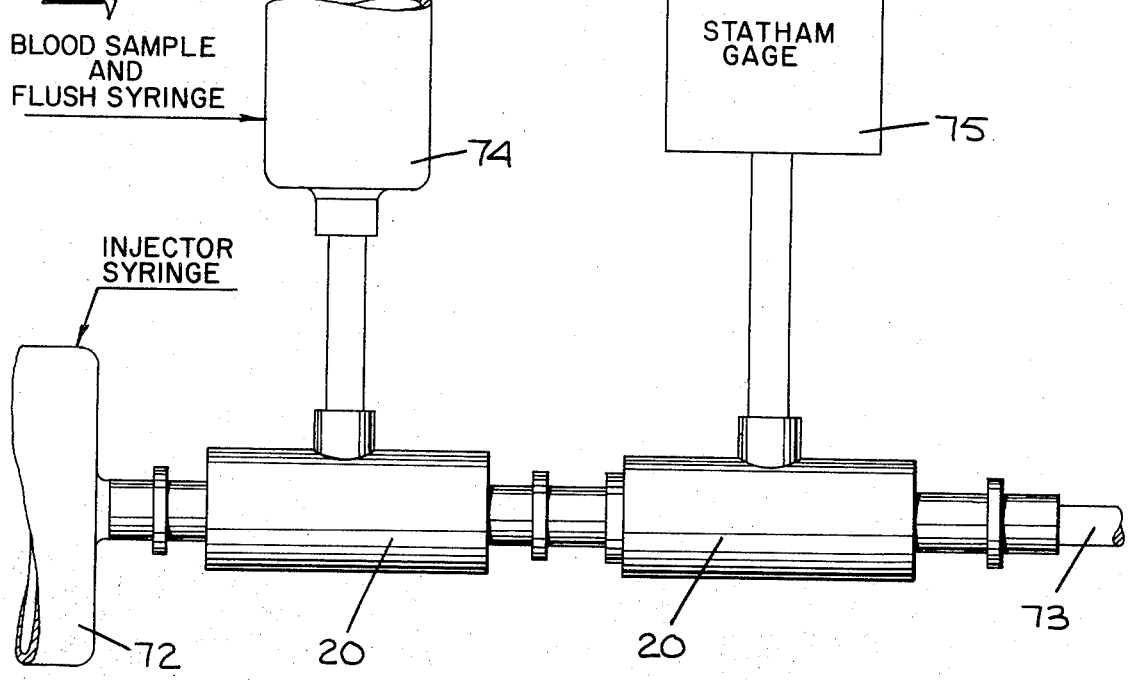
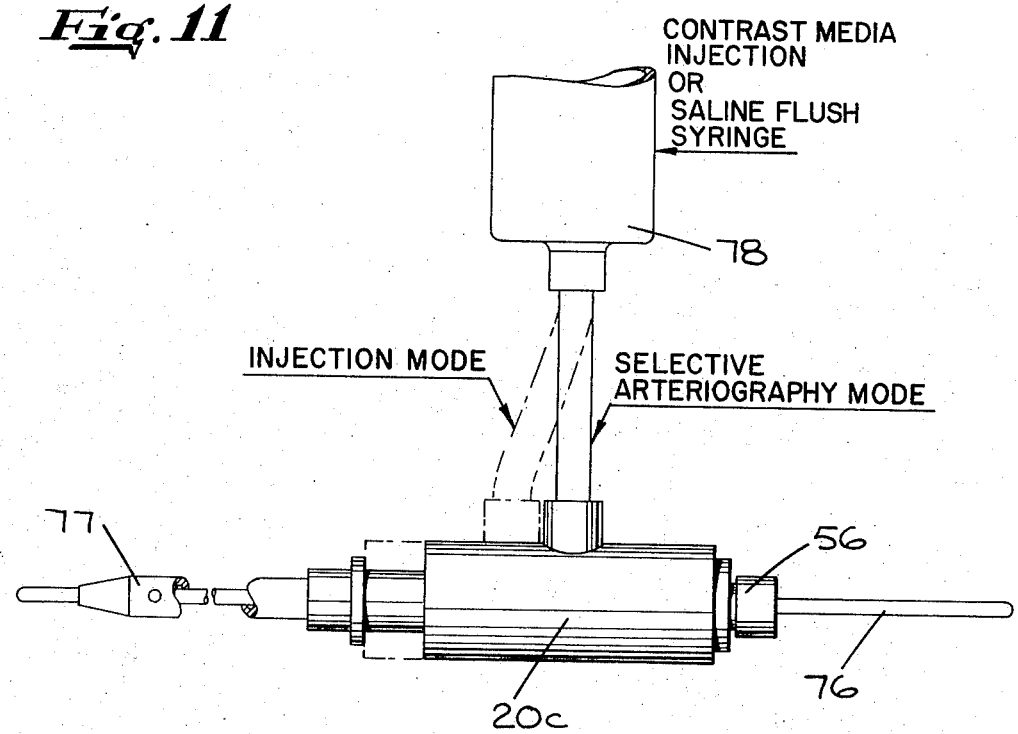

3,859,985

ANGIOGRAPHY VALVE

BACKGROUND OF THE INVENTION

In angiography systems, and other fluid systems particularly in the medical field, it is quite important to properly conduct and control flow of fluid through the system. Naturally, this is particularly true in angiography procedures where radiopaque media is transmitted from an injection syringe to a patient. Flow must be closely watched for a number of reasons such as guaranteeing that air bubbles are eliminated from the flow path; therefore, the valve will be made of transparent plastic.

In angiography procedures, fluid is introduced under extremely high pressure such as one thousand psi internal pressure in a high strength low cost system including the valves is extremely advantageous. Naturally, disposability and sterility are also important as well as high material strength in view of the high pressure of fluid flow is of importance. Naturally, under these conditions it is imperative that positive control be maintained by the various types of valves for the particular procedure being conducted.

The valves must be designed so that interengagement of a variety of different tubes and valve structures and fluid reservoirs can be accomplished in any desired fashion to facilitate introduction of the fluid under the appropriate high pressures in the desired manner. The more versatile the valve structure, the more uses it has in a complex field such as radiology. Efforts to impose standardization in a technique field such as radiology can be facilitated if simple, functional, multipurpose units are offered the medical profession.

Consequently, an angiography valve with design modifications capable of utilizing the valve in many major techniques would be of great value. Also, if the valve can be provided either as a sterile, disposable, autoclavable product or one for single use only would be of great value.

SUMMARY OF THE INVENTION

With the above in mind, a low cost, sterile, disposable valve structure is provided which is particularly adaptable for use in conducting and controlling radipaque media in angiography procedures. The valve structure is designed so that it can easily maneuvered into a multiplicity of different complex angiography systems without difficulty while still maintaining control of fluid flow which often reaches an internal pressure of one thousand psi.

In summary, a valve is provided which is adapted to be inserted in a predetermined flow line arrangement. The valve includes an inner member having at least one axial bore and at least one inner annular groove communicating with each bore. At least one sealing ring is exteriorly mounted on the inner member to isolate the grooves. An outer member having a radially extending outlet is mounted on the inner member so as to be rotatably and reciprocally movable with respect thereto so as to selectively place the outlet in communication with one of the grooves and pointed in any desired direction.

More specifically, a plastic sterile disposable three-way valve is provided to facilitate the introduction of a radiopaque media from a high pressure angiography machine to a catheter placed in the blood vessel of a person. The valve provides for a side arm port which will rotate 360° around the axis of the valve body for connection to an outside source of fluid. The side arm port also acts as a collector for fluid flow. When the arm is slid toward the male body connector, the hole in the arm is lined up with groove in the body. This groove has a hole leading to a through flow hole at 90° to its axis thus providing for fluid flow into the angiography machine or into the patient (medicament). When the arm is slid in the opposite direction, the side arm port is isolated by two hydraulic O-ring seals. This seal will withstand the high pressure of angiocardiography.

With the above objectives, among others, in mind, reference is had to the attached drawing.

BRIEF DESCRIPTION OF THE DRAWING

In the drawing:

FIG. 10 is a schematic view of a pair of valves of the invention shown in a fluid flow arrangement for a modified coronary catheter procedure; and FIG. 11 is a schematic view of a valve of the invention shown in a fluid flow system for arteriography procedures.

DESCRIPTION OF THE PREFERRED EMBODIMENTS

Figure 1:
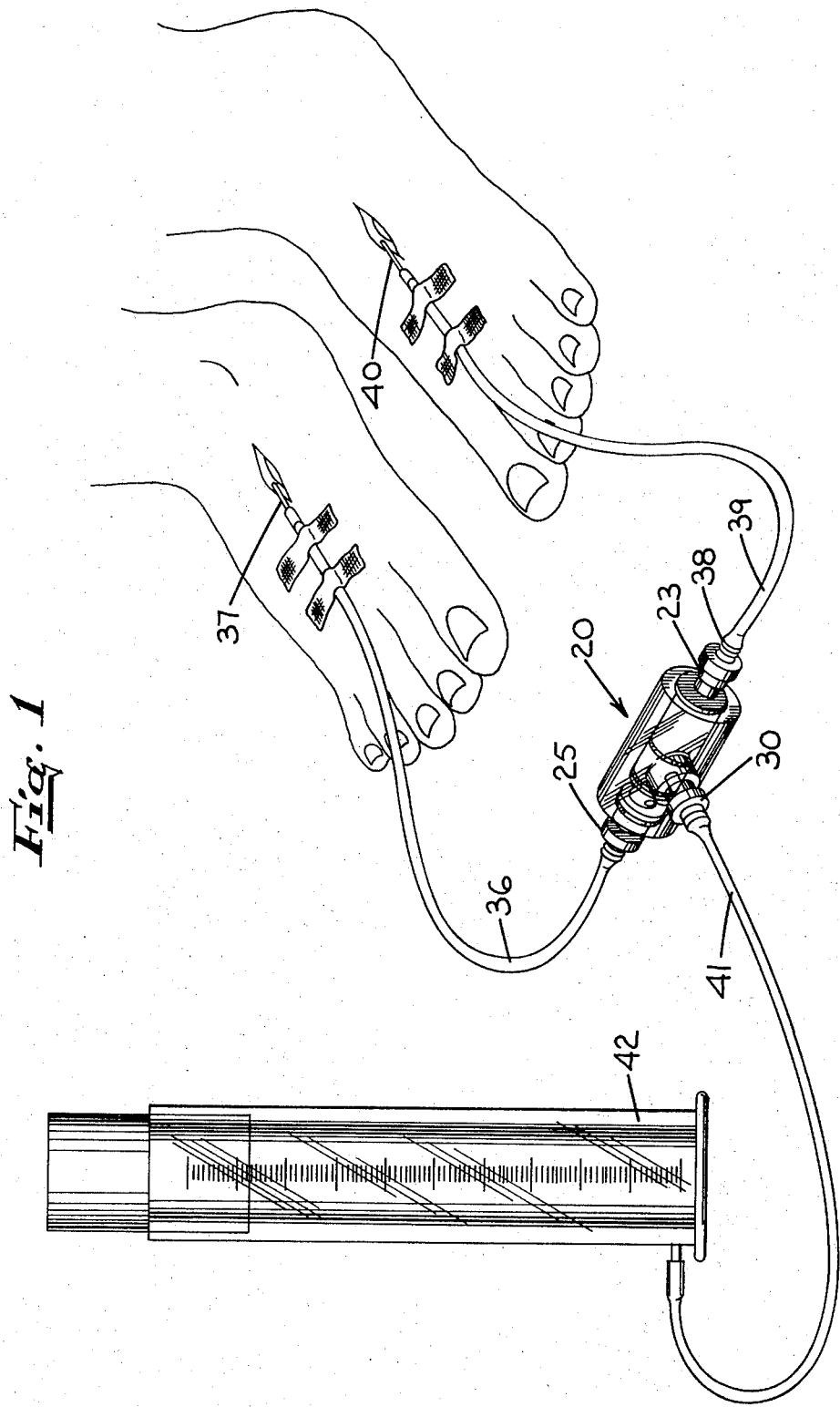
FIG. 1 is a perspective view showing the angiography valve of the invention in a flow line between a source of fluid and a patient.

FIGS. 1–4 of the drawing depict one embodiment of a valve 20 of the present invention. Valve 20 is designed for use of any fluid flow path and is particularly useful in the medical field. As previously described, angiography procedures are particularly receptive to a valve as shown in the depicted embodiments.

Valve 20 includes an elongated cylindrically shaped inner member 21 which has an axial passageway 22 throughout its entire length. One open end of inner member 21 has a flanged tip 23 for a particular type of connection. In correspondence therewith the end portion of passageway 22 adjacent flange tip 23 is frusto conical in configuration so as to be wider at the rear tip. This frusto conical opening 24 provides a luer taper of the female type for connection in a conventional manner.

In contrast, the opposite open end of inner member 21 includes a frusto conical extending tip 25 with an opening through the center and a frusto conical configuration on its outer surface. Tip 25 extends from the enlarged main body portion of inner member 21 so as to form a conventional type of male luer taper.

Intermediate the ends of the outer surface of inner member 21 is mounted in concentric fashion an outer substantially concial member 26. A passageway extends axially through inner member 26 and is larger than the outer surface of the majority of inner member 21 so that outer member 26 is free to rotate about inner member 21 for a complete circumference for 360°. Furthermore, there is sufficient clearance provided between outer member 26 and inner member 21 so that outer member 26 can slide reciprocally with respect to the outer surface of inner member 21.

Figure 2:
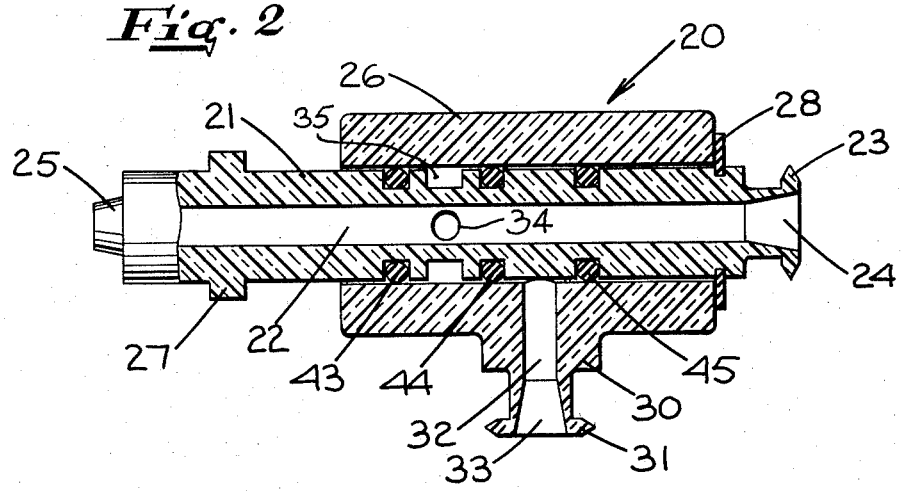
FIG. 2 is a sectional side elevation view of the valve of the invention in the closed position.
Figure 3:
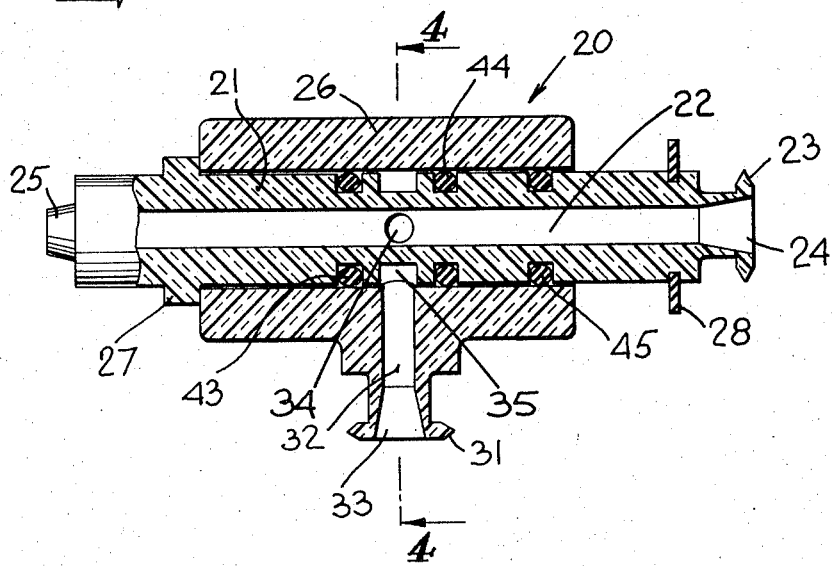
FIG. 3 is a sectional side elevation view thereof showing the valve in the open position.
Figure 4:
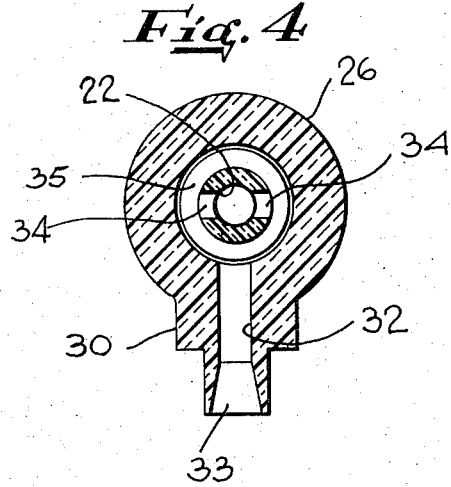
FIG. 4 is a sectional end view thereof taken along the plane of line 4—4 of FIG. 3.

For this purpose, outer member 26 is shorter in length than inner member 21 and is slidable between two extremes on inner member 21. The extremes or limits are defined by projecting stop surfaces on the outer surface of inner member 21. As shown, adjacent to tip 25 is an annular rib 27 which is integral with remainder of body portion 21 and extends radially therefrom. In this manner the edge of outer member 26 is engaged by annular projection 27 when it is slid to one extreme position. The other extreme position is defined by an annular removable stop washer 28 which is normally mounted in an annular notch 29 in the outer surface of inner member 21. Washer 28 is of sufficient diameter so as to engage with the edge and outer member 26 and limit its stop in one direction as shown in FIG. 2. Washer 28 is located adjacent to flange tip 23 and annular projection 27 is located adjacent to tip 25 so that outer member 26 is free to slide in a reciprocal manner between the two stop means 27 and 28. By providing washer 28 in a removably mounted position on inner member 21, it is possible to remove washer 28 and slide outer member 26 off inner member 21 when desirable after use of valve 20. This may be necessary during disposal operations or in a reuse environment for facilitating resterilization procedures. The washer 28 may also be permanent to prevent reuse of the valve.

Outer member 26 has a radially extending outlet 30 terminating in a flanged tip 31. A passageway 32 extends through outlet 30 and communicates with the interior of outer member 27 and is open to the exterior of the valve while terminating in a frusto conical portion 33 which forms a female luer type connection of a conventional fashion.

Inner member 21 has a diametric opening 34 which is substantially perpendicular to axial passageway 22 and communicates therewith. The extremities of diametrical opening 34 communicate with an annular recess 35 in the outer surface of inner member 21.

FIG. 1 displays valve 20 in an environmental angiography set-up. Tip 25 is connected in a conventional fashion to tube 36. The other end of tube 36 has a needle 37 extending therefrom for introduction into a patient. The opposite tip 23 of valve 20 is connected in a conventional fashion to connector 38 of a tube 39. The other end of tube 39 has a needle 40 extending therefrom for introduction into another portion of a patient's anatomy.

Radial portion 30 is connected to tube 41 which has its second end connected to a source of fluid for radiography operations. As shown, the fluid source is a vial and piston arrangement 42 with a scale on the exterior surfaces thereof. All connections are made in a conventional fashion well known in the medical profession with the connections to valve 20 being made between conventional luer engaging surfaces.

With the connections as shown in FIG. 1, it can be readily seen how in angiography operations often bulky and unwieldy equipment as well as a relatively immovable patient have to be considered. Therefore, the fact that outer member 26 is rotatable about inner member 21 in a 360° fashion permits easy connection between the various fluid distribution points.

In operation, when connected as shown in FIG. 1 and the valve in the position of FIG. 2, there is no communication between the source of fluid tube 41 and the remainder of the fluid system connector to the patient. There is a continuous passageway between needle 37 and needle 40 and consequently, when needles 37 and 40 are in a patient's veins, blood can flow through the system including valve 20 without any open connection being present to tube 41. In this closed position, outer member 26 abuts against stop washer 28. Leakage is prevented by the provision of three gaskets 43, 44 and 45. The gaskets are seated in appropriate recesses in the outer surface of inner member 21 so as to engage with the inner surface of slidable and rotatable outer member 26. Spaced annular gaskets 43 and 44 frame openings 34 and 35 and seal the openings therebetween. When the valve is in the closed position as shown in FIG. 2, gaskets 44 and 45 frame opening 32 in radial portions 30 and seal opening 32 from communication with openings 22, 34 and 35.

When it is desired to introduce fluid through tube 41 from source 42 into valve 20, outer member 26 is slid with respect to inner member 21 until opening 32 is aligned with openings 34 and 35. In the fully opened position the end of outer member 26 abuts against annular stop 27. In this position, fluid under high pressures can be introduced through tube 41 into radial passageway 32 and then through communicating passageways 35, 34 and 22 into tubes 36 and 39 and, thereafter, into the veins of the patient. Naturally, fluid can be removed through a similar passage network with a slight modification in the tubular network so that a means for withdrawing a fluid is connected to radial portion 30.

To once again shut valve 20 off, outer member 26 can be slid with respect to inner member 21 until it abuts against stop washer 28. At that time, radial portion 30 will be positioned between sealing gaskets 44 and 45 and there will be no communication with the remaining passageways of the fluid network. Leakage is prevented from passageways 34 and 35 by means of gaskets 43 and 44.

By providing the 360° rotation between members of valve 20 and varying the various types of connectors at the terminal ends and the radial end of the valve structure, a variety of different fluid system hook-ups can be derived.

Figure 5:
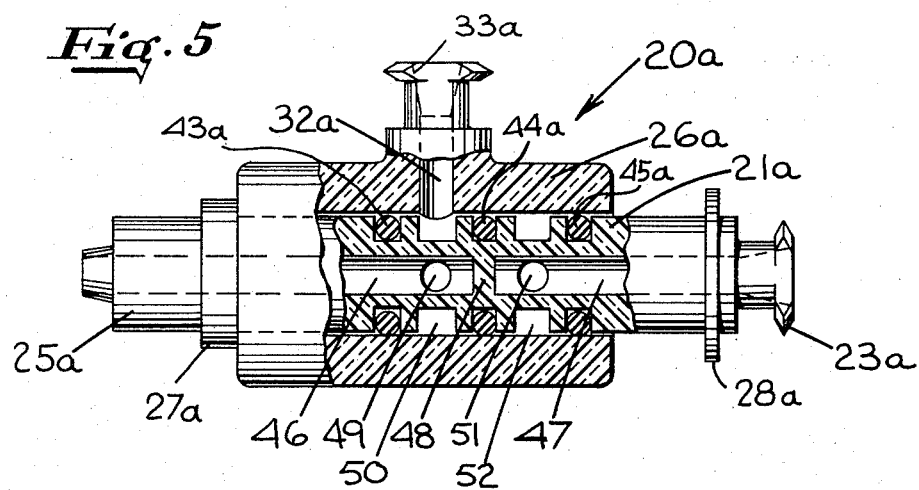
FIG. 5 is a fragmentary sectional side elevation view of an alternative embodiment of the valve of the invention.

For example, FIG. 5 discloses a modification designated as valve 20a parts to parts of the previously discussed embodiment are identified with the same numerical representation and the addition of the subscript "a." The difference is structure of modification of FIG. 5 resides in inner member 21a. There is no continuous axial passageway through the inner member but a pair of axial passageways 46 and 47 which are separated by a centrally located blockage wall 48. Passageway 46 is open to the exterior of the valve through tip 25a and the other opening 47 is open to the exterior of the valve through flange tip 23a. Adjacent to wall 48 axial passageway 46 has a diametric opening 49 which communicates with an annular recess 50. A similar arrangement is adjacent to wall 48 with respect to opening 47. Diametric passageway 51 communicates with annular passageway 52. In turn, diametric passageways 49 and 51 are in communication with axial openings 46 and 47 respectively and are substantially perpendicular to those respective openings. In this manner, no matter which of the two sliding positions outer member 26a is in with respect to inner member 21a, radial passageway 32a will be in communication with passageway 46 and the interconnected network as shown in FIG. 5 or in communication with axial passageway 47 and the interconnected network on the other side of central wall 48. This particular embodiment is particularly useful in angiography procedures as a two-way exchange flush valve.

Figure 6:
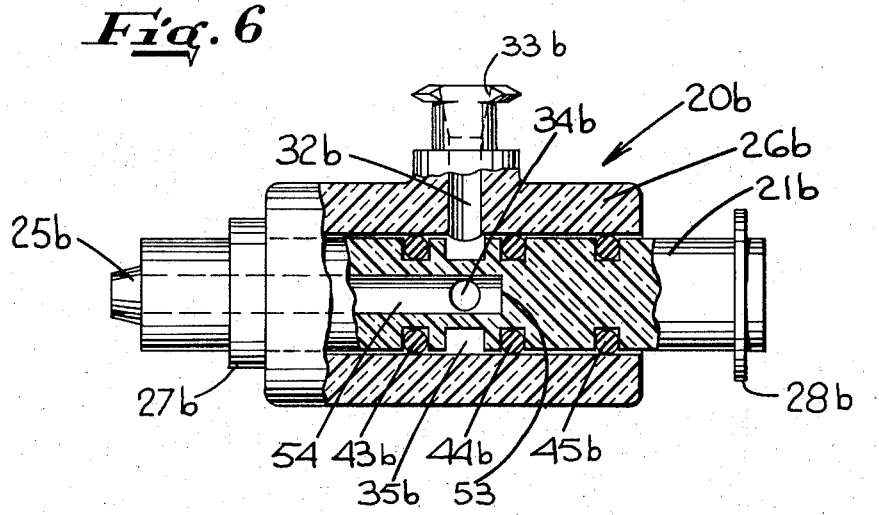
FIG. 6 is a fragmentary partially sectional side elevation view of a further alternative embodiment of the valve of the invention.

A second modification is depicted in FIG. 6 of the drawing as valve 20b. Similar parts as those employed in regard to previous embodiments are identified with the same reference numeral in addition of the subscript "b." In regard to this particular embodiment, all of the components are identical to the components of the first discussed embodiment with the exception of the central axial passageway of inner member 21b. The passageway in valve 20b extends from an open end tip 25b to a central closed axial termination point 53 which is located between gaskets 43a and 44a. This results in an axial passageway 54 which is open at one end and closed and an interior end in the central area of inner member 21b. With this arrangement, when valve 20b is in the position depicted in FIG. 6, fluid can flow through open tip 25b into passageway 54 and then out of valve 20b through diametric opening 34b, annular interconnected passageway 35b and radial opening 32b to an appropriate destination. Naturally, flow will occur in either direction depending upon the direction of the force applied.

When outer member 26b is shifted to its opposite axial extremity with respect to inner member 21b, radial passageway 32b will be sealed by gaskets 44b and 45b from the passageways in inner member 21b. This will naturally prevent flow through valve 20b achieving a complete shut-off. In this manner, valve 20b is adaptable for use as a one-way rotating valve.

Figure 7:
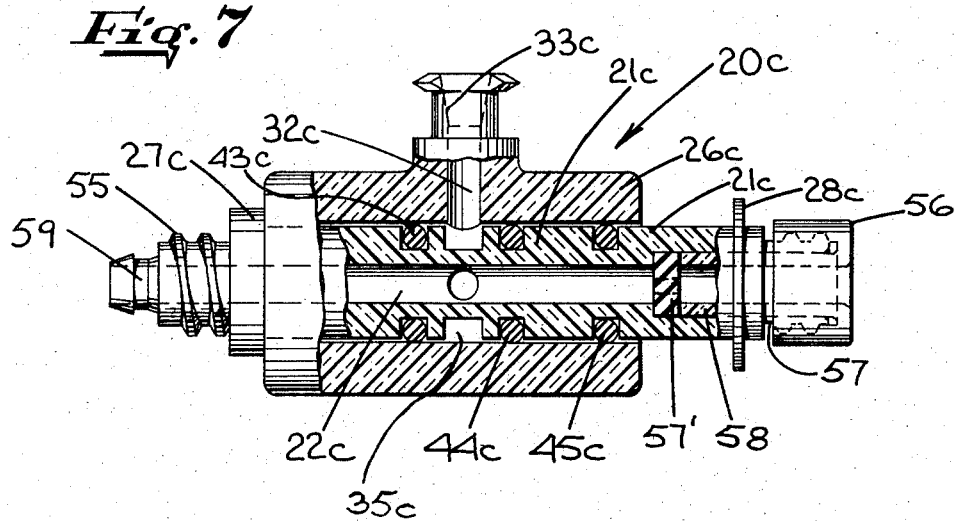
FIG. 7 is a partially sectional side elevation view of still a further alternative embodiment of the valve of the invention.

A further additional embodiment designated as valve 20c in FIG. 7 is similar in many respects to the previous embodiments and similar parts are labeled with the same reference numeral as the initial embodiment with the addition of the subscript "c" thereafter. Outer rotatable and slidable member 26c is substantially identical in structure as that of the previous embodiment and operates in a similar manner. Once again, the differences in structure reside in inner member 21c. In this respect all changes are in the tip portions. At one end in place of the male luer type tip 25 is a male thread 55 which terminates in a conical tip 59. An adapter with the corresponding female thread and an internal conical tip can then be mounted on the inner member for reception of flared plastic catheters. The opposite end of inner member 21c contains a cylindrical cap 56 seated on a projecting rear hollow tip 57. Cap 56 when fully seated will compress a rubber bushing 57' by means of engagement between hollow prong 58 and the bushing thus causing the bore 22c to be normally sealed but permitting introduction of a wire through the rubber bushing 57' and into passage 22c when rubber bushing 57' is not compressed. Thereafter the wire may extend out through the other end of inner member 21c for introduction into a tube and further, if desired, into a patient as a guidewire.

In the position shown in FIG. 7, outer member 26c is in position in abutment with annular shoulder 27c. This provides communication between radial passageway 32c and the communicating passageways and interior member 21c. In this manner, fluid can flow between the radial opening 33c in outer member 26c and the opening in tip 59 of inner member 21c.

When it is desired to use the guidewire, outer member 26c can be shifted until it engages with annular washer 28c. In this position, radial passageway 32c will be out of communication with the passageways in body 21c and will be sealed therefrom with the assistance of gaskets 44c and 45c. The guidewire can then be inserted through the cap 56 and passed through axial passageway 22c in the fashion desired.

As previously described, one use of valve 20 is depicted in the fluid arrangement in FIG. 1. FIGS. 8–11 show alternative arrangements for the valve embodiments identified above as valves 20–20c. The versatility of the valve structure is clearly demonstrated.

Figure 8:
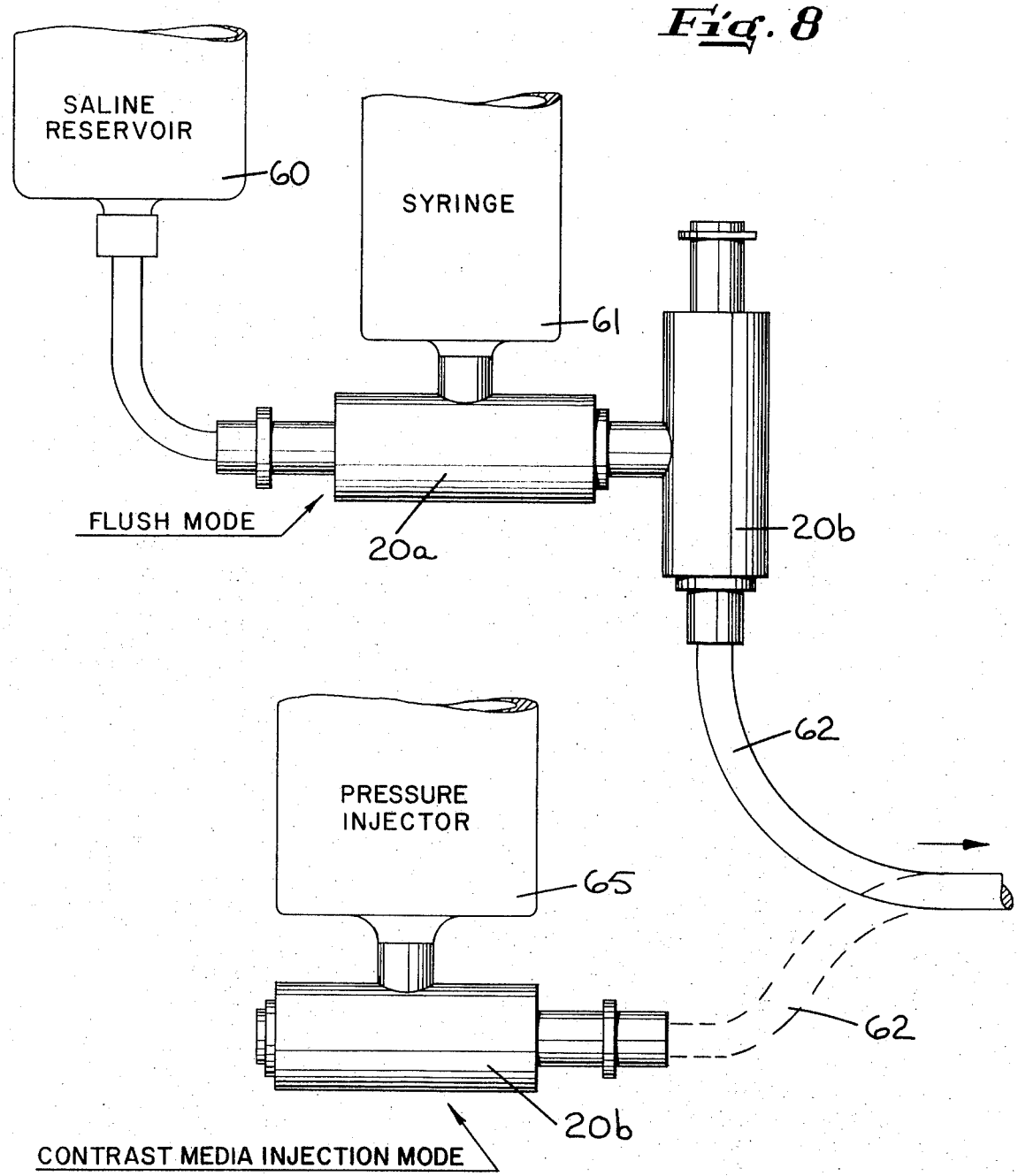
FIG. 8 is a schematic view of several embodiments of the valve of the invention shown in a fluid flow arrangement for cerebral angiography procedures.

For example, in FIG. 8 a cerebral angiography set-up is shown with the two separate fluid networks arranged for that particular procedure. As depicted, in the flush mode, fluid from a saline reservoir 60 is held in reserve by valve 20a while a syringe 61 connected to the radial arm of valve 20a is in fluid communication with the remainder of the network. Valve 20a is connected to the radial arm of a valve 20b which is shown in the open position in communication with a tube 62 going to the patient. The shifting of valve 20b to the closed position will shut off flow between the tube 62 going to the patient and the remainder of the fluid system. Shifting of valve 20a to its second position in the manner described above will permit fluid communication between reservoir 60 and syringe 61 and will permit filling and alternate refilling of syringe 61. The fluid collected in syringe 61 will be conducted through valve 20b to tube 62. This arrangement of valve variations permits alternate flushing of tube 62 without contaminating saline reservoir 60 when fluid is pumped into the human body and more importantly when fluid is withdrawn from the human body.

For secondary use in cerebral angiography procedures as shown in FIG. 8, valve 20b could be removed from interconnection with valve 20a in and connected through its radial arm to an injector reservoir 65 so that when that secondary valve 20b is shifted to the open position in the manner described above fluid will be transferred through the interconnected passageways from injector 65 through tube 62 into the system. This is useful in the known procedure identified as the contrast media injection mode in contrast to the flush mode also depicted in FIG. 8.

Figure 9:
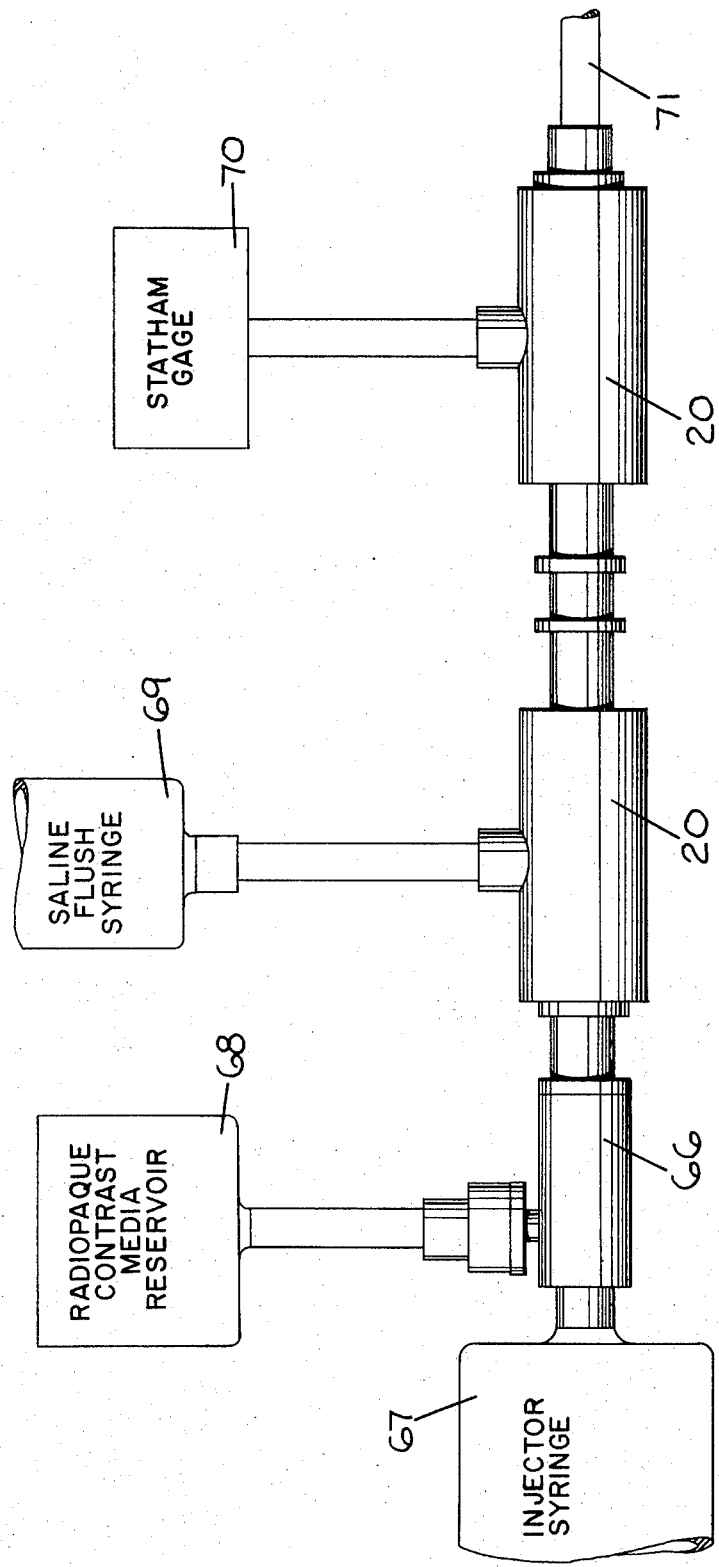
FIG. 9 is a schematic view of several embodiments of the valve of the invention in a fluid flow arrangement for coronary catherization procedures.

FIG. 9 depicts left heart, right and left coronary catheterization procedures. In general, a pair of valves 20 are shown interconnected in series with a conventional type of automatic valve 66. Automatic valve 66 is connected in turn to an injector syringe 67 and a source of radiopaque contrast media 68. One of the valves 20 shown with its radial arm in closed position is connected to a saline flush syringe 69 while the other valve 20 shown in open position is connected to a statham guage 70. The outlet end of valve 20 connected to the statham gauge is connected to a tube 71 for introduction to the patient. As shown, the injector syringe 67 can be utilized to inject radiopaque contrast media from reservoir 68 as desired with gauge 70 in operation. Then when it found to be desirable, the valve 20 which is shown in the closed position can be shifted to the open posiiton to introduce saline solution from syringe 69 to the system.

FIG. 10 shows a further arrangement of the valves which is particularly useful in right heart catheterization with a lung visualization option. A pair of valves 20 are connected in series with the remote end of one valve connected to an injector syringe 72 and the open end of the other valve 20 connected to a tube 73 for introduction to the patient. The radial arm of the valve 20 connected to syringe 72 is connected to a blood sample and flush syringe arrangement 74. The radial arm of the other valve 20 is connected to a statham gauge 75. Once again operation of the valves 20 permits the desired introduction of appropriate fluids into the system at high pressures without difficulty.

Finally, the arrangement of FIG. 11 depicts a valve 20c in a fluid system designed for a selective arteriography mode. This is the procedure as discusssed above where in the position shown a guidewire 76 can be introduced through cap 56 and then through the remainder of the passageway in valve 20c. It can then be further inserted through an appropriate catheter 77 into a patient. In this mode, valve 20c is in the closed position so there is no communication between its radial arm and its axial passageway. As shown, the radial arm is connected to a syringe 78 containing a media contrast injection or a saline flush solution. Therefore, when guidewire 76 is not present and a valve is shifted to the injection mode as shown in phantom in FIG. 11, fluid communication will exist between the radial arm passageway and the passageways of the inner member of valve 20c so that fluid can pass from syringe 78 through the valve and connect a tubing through the patient.

From the above discussed embodiments and arrangements, it is apparent how the present invention is designed for use in many major angiography techniques. It is readily apparent that the valve designed are adaptable for other conventional medical and non-medical procedures.

Thus, the above discussed objectives, among others, are effectively attained.

I claim:

1. A valve adapted to be inserted in a predetermined flow line arrangement and designed to withstand high flow pressures comprising; an inner member having at least one axial bore and at least one inner annular groove communicating with each bore, sealing rings exteriorly mounted on the inner member to isolate the grooves, an outer member having a hollow radial extention for fluid flow therethrough and being mounted on the inner member so as to be rotatably and reciprocally movable with respect thereto so as to selectively place the outlet in communication with one of the grooves and pointed in any desired direction, the inner member being cylindrical in configuration and having an annular outer surface, each sealing ring being an 0-ring externally mounted on the outer surface of the inner member, the outer member having an annular inner surface corresponding to the annular outer surface of the inner member and to engage in sealing relationship with respect to the sealing rings, the outer member being freely rotatable 360° about the inner member in sealed relationship with respect to the 0-rings about the entire rotational path, and the inner and outer members being transparent to facilitate observation of the flow paths therethrough.

2. The invention in accordance with claim 1 wherein the outer member is shorter than said inner member and stop means are provided on the outer surface of said inner member to engage with the edges of said outer member and to define a predetermined travel path of said outer member with respect to said inner member.

3. The invention in accordance with claim 1 wherein there are three spaced sealing rings on said inner member, the outer annular groove on said inner member being positioned between the first and second sealing members, the radially extending outlet in said outer member being positioned so that when said outer member is in one position the radially extending outlet is between said first and second sealing rings and in communication with the groove in the inner member and when said outer member is shifted to a predetermined position said radially extending outlet is positioned between said second and third groove and sealed from communication with said annular groove.

4. The invention in accordance with claim 1 wherein said inner member has a pair of spaced annular grooves on the outer surface thereof, three spaced sealing rings are mounted on the inner member with one of the annular grooves positioned between the first and second sealing ring and the other of the annular grooves positioned between the second and third sealing rings, the radially extending outlet in the outer member being positioned so that when the outer member is in a first position the outlet will be in alignment with the one of said grooves and when the outer member is shifted to a second position the outlet will be in communication with the other of said grooves.

5. The invention in accordance with claim 1 wherein there are three spaced sealing rings on said inner member, the outer annular groove on said inner member being positioned between the first and second sealing members, the radially extending outlet in said outer member being positioned so that when said outer member is in one position the radially extending outlet is between said first and second sealing rings and in communication with the groove in the inner member and when said outer member is shifted to a predetermined position said radially extending outlet is positioned between said second and third groove and sealed from communication with said annular groove, the axial bore of said inner member extending from one open end and terminating intermediate the ends of the inner member.

6. The invention in accordance with claim 3 wherein a cap having an inwardly extending prong is mounted on one end of said inner member in threaded interengagement therewith and a bushing is in the bore so that when the cap is threaded on the inner member, the prong willl compress the bushing and the axial bore of said inner member will be sealed at said one end.

* * * * *